(12) United States Patent
Garza

(10) Patent No.: US 7,309,973 B2
(45) Date of Patent: Dec. 18, 2007

(54) MITIGATION OF HARMONIC CURRENTS AND CONSERVATION OF POWER IN NON-LINEAR LOAD SYSTEMS

(75) Inventor: Filiberto D. Garza, Odessa, TX (US)

(73) Assignee: Power Conservation Ltd, Dallas, TX (US)

( * ) Notice: Subject to any disclaimer, the term of this patent is extended or adjusted under 35 U.S.C. 154(b) by 0 days.

(21) Appl. No.: 11/379,965

(22) Filed: Apr. 24, 2006

(65) Prior Publication Data

US 2007/0247104 A1 Oct. 25, 2007

(51) Int. Cl.
*H02P 27/16* (2006.01)
*G05F 1/70* (2006.01)

(52) U.S. Cl. ...................... 318/729; 318/438
(58) Field of Classification Search ................ 318/438, 318/729, 745
See application file for complete search history.

(56) References Cited

U.S. PATENT DOCUMENTS

| | | | |
|---|---|---|---|
| 4,481,455 A * | 11/1984 | Sugimoto et al. ........... 318/778 |
| 4,812,669 A | 3/1989 | Takeda et al. |
| 4,939,486 A | 7/1990 | Bergdahl et al. |
| 5,444,609 A | 8/1995 | Swamy et al. |
| 5,465,203 A | 11/1995 | Bhattacharya et al. |
| 5,576,942 A | 11/1996 | Beverly et al. |
| 5,585,708 A | 12/1996 | Richardson et al. |
| 5,586,018 A | 12/1996 | Aoyama et al. |
| 5,663,636 A | 9/1997 | Falldin et al. |
| 5,757,099 A | 5/1998 | Cheng et al. |
| 5,789,928 A | 8/1998 | Baker |
| 5,814,901 A | 9/1998 | Ihara |
| 5,831,410 A | 11/1998 | Skibinski |
| 5,844,791 A | 12/1998 | Swamy |
| 6,009,004 A | 12/1999 | Swamy |
| 6,043,569 A | 3/2000 | Ferguson |
| 6,127,743 A | 10/2000 | Levin et al. |
| 6,351,397 B1 * | 2/2002 | Sawa et al. ................... 363/50 |
| 6,400,119 B1 | 6/2002 | Garza et al. |
| 6,465,979 B1 | 10/2002 | Leijon et al. |
| 6,605,882 B2 | 8/2003 | Boudrias et al. |
| 6,636,405 B2 | 10/2003 | Lowenstein |
| 6,771,524 B2 * | 8/2004 | Miguchi ..................... 363/149 |
| 6,906,501 B2 | 6/2005 | Wu et al. |
| 2004/0183377 A1 | 9/2004 | Levin et al. |

* cited by examiner

*Primary Examiner*—Bentsu Ro
(74) *Attorney, Agent, or Firm*—Dennis T. Griggs

(57) ABSTRACT

An AC power controller system applies three-phase AC operating power to an induction motor that drives a non-linear mechanical load. A primary low pass filter is connected in series between branch phase conductors and a power controller of the type that uses gate-controlled switching thyristors for controlling power to the motor. KVAR capacitors connected between the power controller and the induction motor phase windings form a secondary low pass filter across the controller output terminals. The primary and secondary low pass filters isolate the power controller and induction motor with respect to spurious noise and harmonics generated by local as well as remote sources, and also improve real power transfer efficiency from the power generating source to the induction motor by transforming the effective impedance of the power source and the induction motor load.

4 Claims, 4 Drawing Sheets

MITIGATION OF HARMONIC CURRENTS AND CONSERVATION OF POWER IN NON-LINEAR LOAD SYSTEMS

REFERENCE TO RELATED ART

This invention is related to the subject matter of U.S. Pat. No. 6,400,119 entitled "Energy Conserving Motor Controller," which is assigned to the assignee of the present invention and incorporated herein by reference.

BACKGROUND OF THE INVENTION

1. Field of the Invention

This invention is related generally to AC power distribution systems, and in particular to AC power controller systems that control the application of AC operating power to induction motors.

2. Description of the Related Art

Spurious noise signals, including harmonic currents, background noise and spike impulse noise are developed on AC power distribution lines. Such noise signals can originate from the power source, the distribution network, local and remote loads coupled to the network, lightning strikes and distribution equipment malfunction. The AC supply current delivered from a public utility is not a pure sine wave and contains harmonics that interfere with proper operation of connected equipment. Additionally, noise and switching transients may be introduced from active loads. By way of example, if a branch is loaded by an electronic dimmer and lamp, the dimmer will "chop" the 60 Hz AC power waveform at a high frequency to reduce the lighting intensity. This will introduce harmonics and high frequency noise on the power distribution conductors.

Such noise is not constant with respect to time, and it also varies from place to place in the power distribution network. Moreover, a typical AC power line network distributes power to a variety of electrical load devices. Each load can conduct a significant level of noise and harmonic currents back onto the power line, causing distortion of the power waveform. Different loads and control devices produce different types and degrees of distortion that may interfere with the operation of the equipment and machines that are being supplied by the distribution network.

The amount of electric power used by machinery and the machinery itself can be affected by waveform distortions present in a power distribution system. Elimination or control of the distortions may provide a substantial cost savings with respect to electrical energy consumption, and a cost savings with respect to machinery failure and repair or replacement. Thus, mitigation and reduction of harmonic distortions in AC power distribution systems can result in a substantial energy cost savings for industrial customers.

In the context of AC power distribution systems, linear electrical loads are load devices which, in steady state operation, present essentially constant impedance to the power source throughout the cycle of the applied voltage. An example of a linear load is an AC induction motor that applies torque to a constant (time invariant) mechanical load. Non-linear loads are loads that draw current discontinuously or whose impedance varies throughout the cycle of the input AC sine wave. Examples of nonlinear loads in an industrial distribution system include arc lighting, welding machines, variable frequency drive converter power supplies, switched-mode power supplies and induction motors that are applying torque to time-varying mechanical loads.

Harmonic currents produced by non-linear loads in an electrical distribution system flow away from the non-linear source and toward the distribution system power supply. The injection of harmonic currents into the power distribution system can cause overheating of transformers and high neutral currents in three phase, grounded four wire systems. As harmonic currents flow through the distribution system, voltage drops are produced for each individual harmonic, causing distortion of the applied voltage waveform, which is applied to all loads connected to the distribution bus.

Harmonic distortion of the voltage waveform affects AC induction motor performance by inducing harmonic fluxes in the motor magnetic circuit. These harmonic fluxes cause heat build-up and additional losses in the motor magnetic core, which reduce power transfer efficiency. Inductive heating effects increase generally in proportion to the square of the harmonic current. Induction motors can be damaged or degraded by harmonic current heating if the supply voltage is distorted. Negative sequence harmonic currents operate to reduce motor torque output. The combination of these effects reduce power transfer efficiency and can cause motors to overheat and burn out.

Harmonic fluxes in the motor windings are either positive, negative or zero sequence depending on the number or order of the harmonic distortion that created them. Positive sequence harmonic magnetic fields (flux) will rotate in the direction of the synchronous field. Negative sequence harmonic flux will rotate in opposition to the synchronous field, thereby reducing torque and increasing overall current demand. Zero sequence harmonic flux will not produce a rotating field, but still will induce additional heat in the stator windings as it flows through the motor magnetic circuit.

Industrial power distribution systems supply AC operating power to connected machinery and devices that produce some harmonic distortion of the AC voltage waveform. Each harmonic of the fundamental frequency, depending on whether it is a positive, negative, or zero sequence, and its percentage of the fundamental, can have an adverse affect on motor performance and temperature rise, as well as increase the energy costs of electrical service that is charged by the utility service provider. Electric utilities must generate service capacity adequate to meet the expected peak demand, kVA (kilovolt amps apparent power), whether or not the customer is using that current efficiently. The ratio of kW (real active Power) to kVA (apparent power) is called the load power factor. Most utilities charge a penalty to customers when the customer's total load power factor is low.

Apparent power can be larger than real power when non-linear loads are present. Non-linear loads produce harmonic currents that circulate back through the branch distribution transformer and into the distribution network. Harmonic current adds to the RMS value of the fundamental current supplied to the load, but does not provide any useful power. Using the definition for total power factor, the real kW is essentially that of the fundamental (60 Hz) AC waveform only, while the RMS value of the apparent kVA is greater because of the presence of the harmonic current components.

A low kW/kVA power factor rating can be the result of either a significant phase difference between the voltage and current at the motor load terminals, or it can be due to a high harmonic content or a distorted/discontinuous current waveform. An unacceptable load current phase angle difference can be expected because of the high inductive impedance presented by the stator windings of an induction motor. A distorted current waveform will also be the result of an induction motor that is applying torque to a non-linear load. When the induction motor is operating under discontinuous load conditions, or when the load is non-linear, high harmonic currents will result, degrading motor performance and reducing power factor.

Some power factor correction can be achieved by the addition of capacitors connected across the induction motor stator windings. The resulting capacitive current is leading current that cancels the lagging inductive current flowing from the supply, thus improving the power factor when the induction motor is driving a linear load. For example, KVAR (Kilovolt Ampere Reactive) capacitors may be installed to correct low power factor caused by the high inductance of stator windings. Harmonic currents produced in the load circuit or that are conducted along the branch power distribution line from remote non-linear sources may find a resonance with the KVAR capacitors, and the resulting high current may cause the capacitors to fail. These harmonic currents, when combined with the inductive reactance of the distribution network, can also cause premature motor failure due to excessive current flow, heat build-up and random breaker tripping.

Controllers for reducing energy consumption of AC induction motors have been developed or proposed. One class of such devices uses a measure of the power factor of the AC induction motor to generate a feedback signal that is used for controlling the amount of power delivered to the motor. The control signal is adjusted from time-to-time to reduce the average power applied to the motor during light loading in order to maintain sufficient rotor slip for operation with a relatively high power factor and good power transfer efficiency.

Various problems arise in the operation of conventional controllers, particularly when controlling power applied to non-linear loads. For example, complex power control factors are presented by the operation of AC induction motors that drive pumping units (pump jacks) used to lift fluids from underground formations. Such pumping units are alternately loaded by a pumping rod, the weight load of the formation fluid column, and opposing counter-weights twice each pumping cycle. Moreover, twice each cycle the opposing loads balance and the motor is thus unloaded twice each cycle. The constantly changing load between peak minimum and maximum values creates severe control difficulties for power factor control systems which must continuously adjust the power delivery to maintain optimum motor efficiency and economy.

Currently, thyristor switches are in use in conventional controllers for controlling the AC power supplied to induction motor loads, for example in the AC power controller disclosed in U.S. Pat. No. 6,400,119. Because of the fast on-off switching action (fast dv/dt) of the thyristors, high peak voltage and high switching frequency, the input current on the supply side of the power controller becomes distorted with high frequency switching transients, which cause an increase of harmonic components in the AC power delivered to the induction motor. Moreover, spurious noise and harmonic currents from remote sources that are conducted down the branch distribution circuit can interfere with the proper switching operation of the controller itself, resulting in loss of power control.

These factors not only reduce the power factor of the branch load, but also interfere with motor operation and inject harmonic currents back through the power distribution branch and into the distribution network. Moreover, controller-generated harmonic distortion increases the RMS value of the load current in the power distribution branch, on which the utility service fees are based, thus increasing the customer's energy costs.

BRIEF SUMMARY OF THE INVENTION

An improved power controller system is provided for increasing the operating efficiency and performance of conventional AC induction motors that receive operating power from an electronic controller that employs fast switching circuits to control the application of AC power to the stator windings of the motor. The improved controller system (a) operates efficiently to drive a non-linear mechanical load under light torque loading as well as full-rated torque loading conditions, (b) mitigates harmonic currents from remote sources, (c) mitigates controller-induced harmonic currents, (d) mitigates load-induced harmonic currents, and (e) operates compatibly with KVAR (Kilovolt Ampere Reactive) capacitors that are connected across the stator windings to improve low power factor caused by the high inductive impedance of the induction motor stator windings.

A primary low pass filter is connected in series between the branch phase conductors and the power controller. KVAR (Kilovolt Ampere Reactive) capacitors are connected across the output terminals of the power controller in shunt to neutral relation. The KVAR capacitor values are coordinated with the inductive reactance values of the stator windings to form a secondary low pass filter across the controller output terminals. The primary and secondary low pass filters isolate the power controller and induction motor with respect to spurious noise and harmonics generated by local as well as remote sources, and also improves real power transfer efficiency from the power generating source to the induction motor.

BRIEF DESCRIPTION OF THE SEVERAL VIEWS OF THE DRAWING

The accompanying drawing is incorporated into and forms a part of the specification to illustrate the preferred embodiments of the present invention. Various advantages and features of the invention will be understood from the following detailed description taken with reference to the attached drawing figures in which.

DETAILED DESCRIPTION OF THE INVENTION

Figure 1:
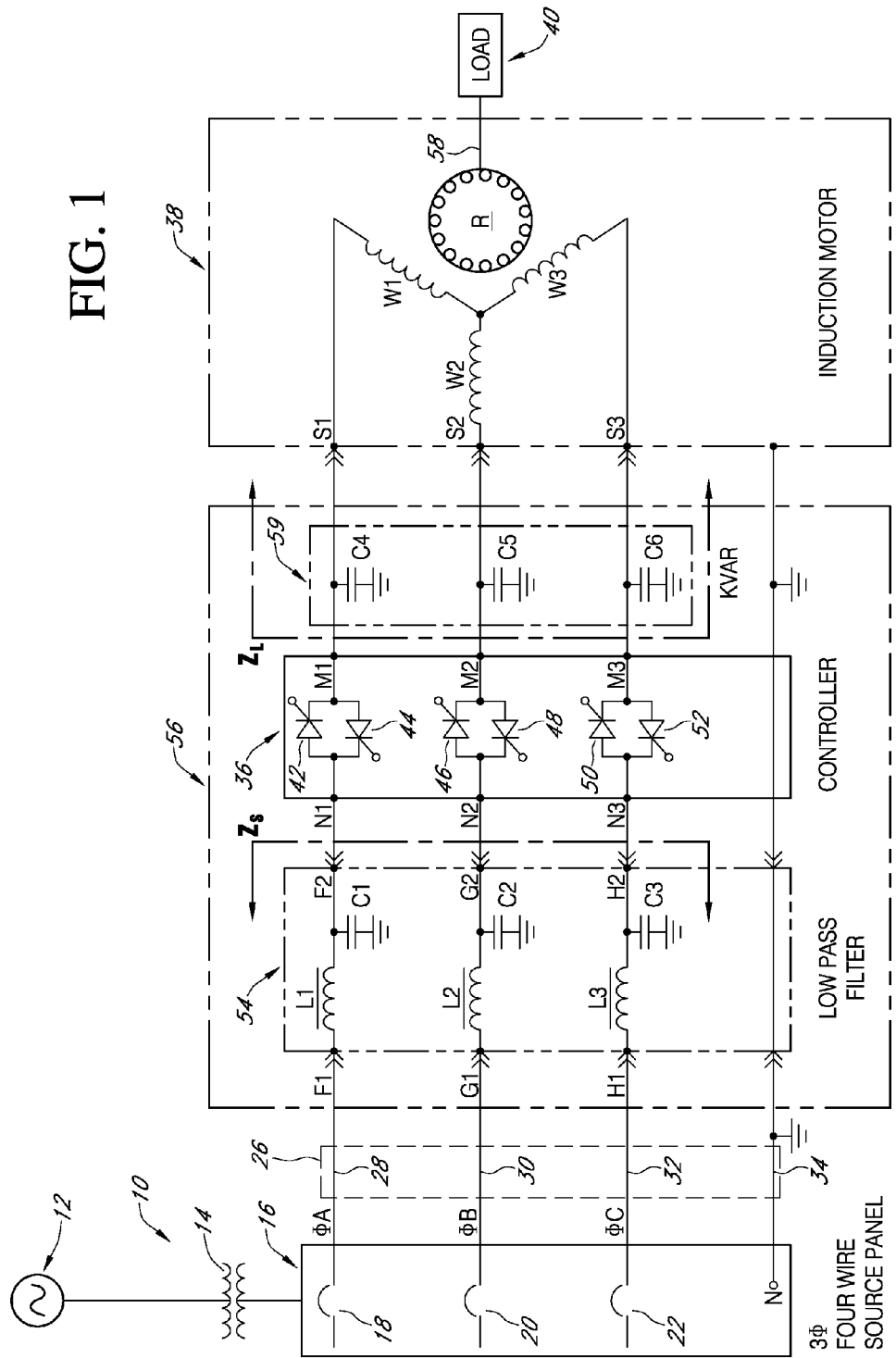
FIG. 1 is a simplified electrical circuit schematic diagram showing the interconnection of an AC power controller for dynamically adjusting the operating power applied to an induction motor to match non-linear load requirements.

Preferred embodiments of the invention will now be described with reference to various examples of how the invention can best be made and practiced. Like reference numerals are used throughout the description and several views of the drawing to indicate like or corresponding parts.

Referring now to FIG. 1, a conventional AC power distribution network 10 supplies power from a high voltage AC power source 12 to a step-down distribution transformer 14. The distribution transformer feeds power at a reduced voltage level to a distribution panel 16 that includes conventional three phase distribution breakers 18, 20 and 22. AC power at a fundamental frequency of 60 Hz and 480 VAC phase-to-phase (277 VAC phase-to-neutral) is conducted via a four conductor, shared neutral branch circuit 26 containing AC phase conductors 28, 30, 32, and a shared neutral conductor 34.

Three-phase AC power is applied via the branch circuit conductors to the input terminals N1, N2 and N3 of an electronic power controller 36. The power controller 36 applies controlled amounts of AC power through its output terminals M1, M2 and M3 to input terminals S1, S2 and S3 of a three-phase induction motor 38. The motor 38 is mechanically coupled in torque power transfer relation to a mechanical load 40. The power controller 36 senses the instantaneous power demand of the mechanical load and adjusts its power output to dynamically match the load demand requirement during each half cycle of the applied power waveform. The AC power applied to the AC induction motor 38 is increased and reduced automatically as necessary to match the non-linear load demand.

Preferably, the power controller 36 is constructed as described in U.S. Pat. No. 6,400,119 entitled "Energy Conserving Motor Controller," which is incorporated herein by reference. As described in the specification of that patent, first and second gate controlled switches (silicon controlled rectifiers) 42, 44; 46, 48; and 50, 52 are connected in parallel with each other in opposing polarity relation in each phase of the applied AC voltage. A trigger generator couples trigger control signals to the respective gates of the SCR switches in response to the timing of sensed zero-crossing events of the AC voltage and current waveforms in each respective stator winding phase of the induction motor.

The first and second SCR switches of each phase are alternately triggered into a conductive state during each alternation of the applied AC voltage and are alternately inhibited from the conductive state for an interval in time proportional to a measured difference in time between the AC voltage zero-crossing and the corresponding AC current zero-crossing as determined by comparing the time difference between successive first and second interrupts corresponding to the zero-crossing events with a continuously running time base.

Figure 4:
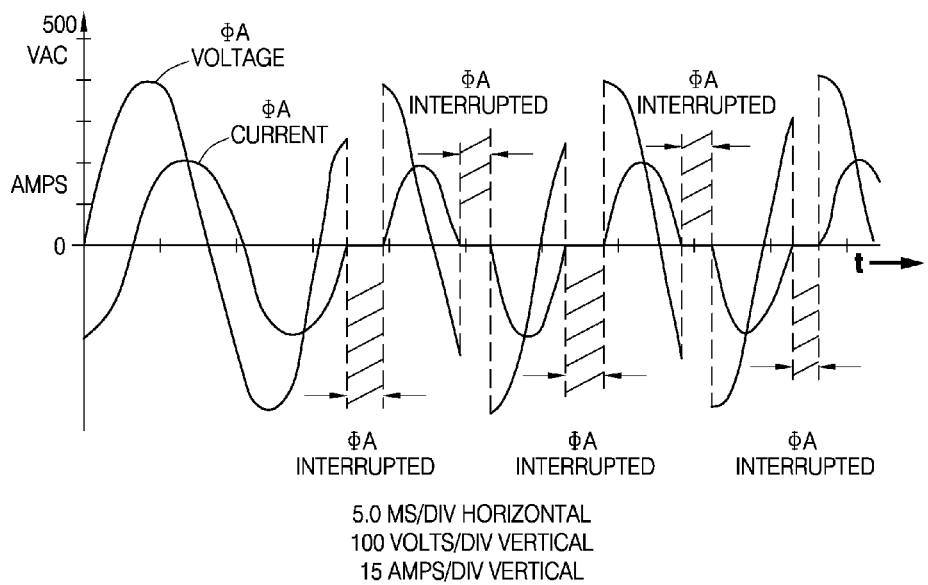
FIG. 4 illustrates typical voltage and current waveforms produced in a representative stator phase winding during controlled operation of the induction motor of FIG. 2.

Referring to FIG. 4, the measured difference in time between the AC voltage zero-crossing and the corresponding AC current zero-crossing in each half cycle of the ΦA waveform is an indication of the instantaneous load demand. The power controller 36 senses the difference and adjusts its output to dynamically match the load demand power level during the next half cycle of the applied AC waveform. The fast switching circuits 42, 44; 46, 48; and 50, 52 in each power phase of the controller 36 alternately conduct and interrupt AC power applied to the AC induction motor 38 in proportion to the measured difference.

By this arrangement, the power applied to the motor is increased or reduced automatically from one half cycle to the next in each phase as necessary to match the instantaneous power requirements of the load 40. Current flow in each phase is interrupted during an interval that is proportional to the measured phase difference between the voltage waveform and the current waveform zero crossings in the preceding half cycle. Thus, current flow is interrupted in only one phase at a time, as the power adjustments proceed consecutively in the three phases ΦA, ΦB and ΦC.

Harmonic currents from remote sources are mitigated by a primary low pass filter 54 that includes three identical LC filter sections in connected in series with the branch power distribution conductors 28, 30, and 32, respectively, at the input terminals N1, N2 and N3 of the controller 36. The controller 36 and the induction motor 38, as well as all other components that may be connected to the filtered side of the branch distribution circuit 26, are isolated from external noise and spurious signals generated by remote devices in other phases or other branches of the power distribution network 10.

Each low pass filter section includes an inductor (L1, L2, L3) connected in series with the phase conductor and a capacitor (C1, C2, C3) connected in shunt from phase to neutral. Each LC section of the primary low pass filter 54 has very low attenuation from DC up through the fundamental power distribution frequency (60 Hz) to a cutoff frequency (e.g., 300 Hz), and substantially attenuates all other signals above the cutoff frequency, including harmonic components up through the 11th order and beyond.

Each section of the primary low pass filter circuit 54 preferably includes an inductor and a capacitor tuned to present high impedance and attenuation of signals at 300 Hz and higher, and present low impedance with very little attenuation or loss to signals from DC through AC power distribution frequencies in the 50 Hz/60 Hz range. Each section of the low pass filter 54 provides a high-frequency attenuation ratio of 40:1 or better at the cutoff frequency, thus isolating the controller 36 and its connected components from external noise and spurious high frequency signals.

For operation at 60 Hz AC power distribution and 300 Hz cutoff frequency, the preferred value of each capacitor C1, C2 and C3 is 3 uF, each rated at 600 VAC service and the preferred value of each inductor L1, L2 and L3 is 0.86 mH. Preferably, each inductor L1, L2 and L3 is an iron core line reactor rated at 56 amps and 40 hp, 480 VAC, 60 Hz service. This allows the 60 Hz AC supply power to pass with virtually no attenuation, thus delivering clean, filtered three-phase AC current and voltage at 60 Hz to the power controller 36.

According to an important feature of the invention, the clean, filtered AC current is supplied from the primary low pass filter 54 as operating power to the internal power supply of the power controller 36. This prevents interference from remote noise sources and assures stable operation of its microprocessor, comparators, trigger circuits and other components that require stable voltage levels. Moreover, because of the bilateral operation of the primary low pass filter 54, harmonics and other noise signals generated by operation of the switching components of the power controller 36 or by the induction motor 38 are attenuated and suppressed, thus inhibiting injection back into the power distribution network 10.

The power factor of the induction motor 38 is improved and the effects of harmonic currents generated by operation of the induction motor under non-linear load conditions are mitigated by KVAR (Kilovolt Ampere Reactive) capacitors C4, C5 and C6 that are connected across the controller output terminals M1, M2 and M3 in shunt to neutral. The KVAR capacitor values are selected and coordinated with the inductance values of the stator phase windings W1, W2 and W3 to provide a secondary low pass LC filter sections in series between the output terminals M1, M2 and M3 of the power controller and the input terminals S1, S2 and S3 of the induction motor.

According to an important feature of the invention, the KVAR capacitor values are selected and coordinated with the inductance values of the stator phase windings W1, W2 and W3 to provide a secondary low pass filter between the output terminals M1, M2 and M3 of the power controller 36 and the induction motor input terminals S1, S2 and S3. Each section of the secondary low pass filter 59 has very low attenuation from DC up through the fundamental power distribution frequency (60 Hz) to a cutoff frequency (e.g., 300 Hz or the 5th harmonic), and substantially attenuates all other signals above the cutoff frequency, including harmonic components up through the 11th order and beyond.

The KVAR capacitors C1, C2 and C3 serve dual purposes: (1) improve the power factor of the induction motor 38, and (2) filter current that flows into the induction motor 38 while suppressing back-flow of harmonic currents generated by the motor. The secondary filter 59 prevents the injection of controller-generated harmonics into the induction motor 38, and prevents the injection of induction motor-generated harmonic currents into controller 36 and the distribution network 10.

Real power transfer efficiency is improved by the impedance transforming effect of the primary low pass filter 54 and the secondary low pass filter 59. The primary low pass filter 54 transforms the power source impedance, which is primarily inductive, to an effective source impedance $Z_S$ that functions as a balanced LC impedance within the pass band of the primary low pass filter 54. The secondary low pass filter 59 has the same effect on the highly inductive input impedance of the induction motor 38. The secondary low pass filter 59 transforms the induction motor impedance into an effective load impedance $Z_L$ that functions as a balanced LC impedance within the pass band of the secondary low pass filter.

According to the maximum power transfer theorem, maximum power transfer may be achieved when the load impedance $Z_L$ is constrained to be equal to the power source impedance $Z_S$. For optimum power factor correction and power transfer efficiency during operation of a three phase, 40 HP induction motor at 60 Hz with 480 VAC three phase power, the preferred value of each KVAR capacitor C4, C5 and C6 is 5 uF, rated for 600 VAC service. Preferably, the values of the KVAR power factor correction capacitors C4, C5 and C6 are selected so that motor power factor improvement, low pass filtering action and optimum power transfer are provided.

The KVAR capacitors C4, C5 and C6 connected in combination with the stator winding inductors W1, W2 and W3 define secondary low pass filter circuits 59. These secondary filter sections transform the highly inductive motor load into a balanced effective load impedance $Z_L$ that is comparable to the effective source impedance $Z_S$ provided by the primary low pass filter 54 at the input to the power controller. Careful selection of the KVAR power factor correction capacitors C4, C5 and C6 for a given induction motor will transform the load impedance presented by the motor, thus improving power transfer in proportion to how closely the transformed load impedance $Z_L$ matches the transformed source impedance $Z_S$.

Figure 5:
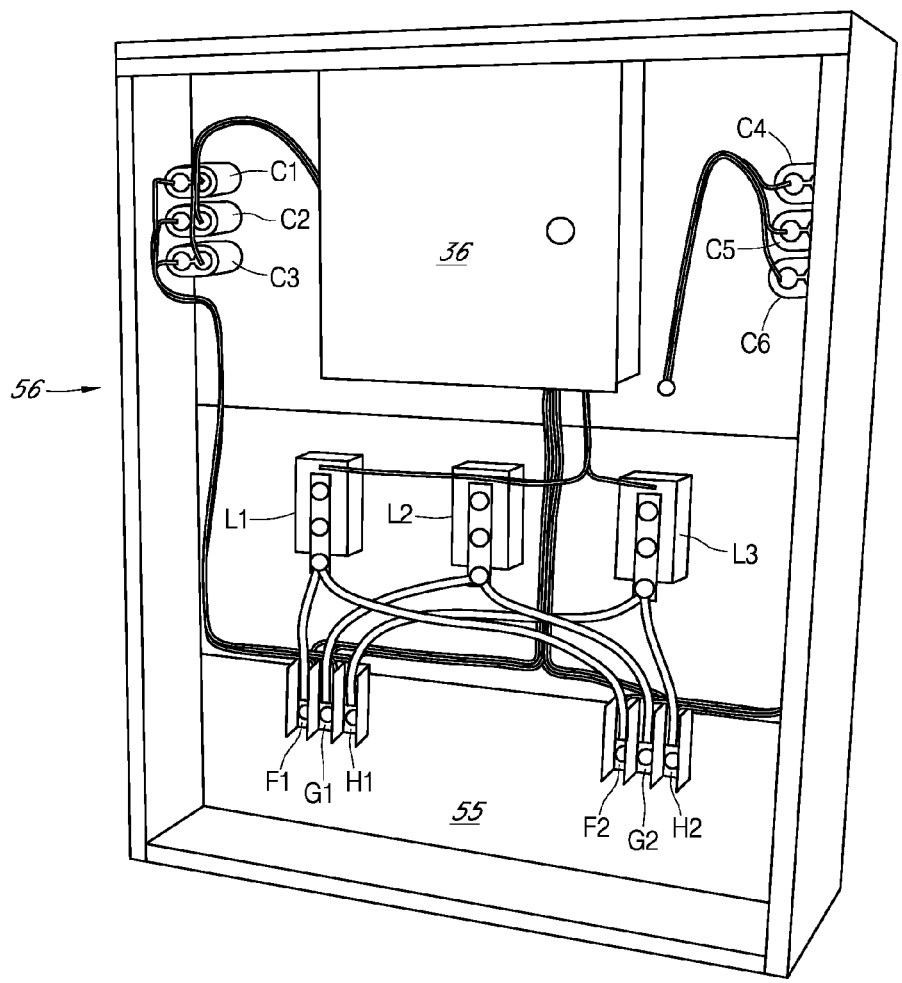
FIG. 5 is a front perspective view showing the physical arrangement of controller system components within a protective housing.

The low pass filter circuit 54, power controller 36 and the KVAR correction capacitors C4, C5 and C6 are enclosed within a common protective housing 55, as shown in FIG. 5. Air cooled heat sinks (not shown) are thermally coupled to the iron core line reactors L1, L2 and L3 on the back side of the housing.

The induction motor 38 is a conventional three-phase induction motor having a 40 hp service rating. AC power at 60 Hz, 480 VAC line to neutral is applied to three phase stator windings W1, W2 and W3 connected in a Wye winding configuration and arranged in stator slots that are symmetrically spaced from each other by 120 degrees. Rotary torque is transmitted by a squirrel cage rotor R that is magnetically coupled to a rotating magnetic flux field produced by the flow of three-phase alternating currents in the stator windings W1, W2 and W3. The rotor R transmits torque to an output drive shaft 58 which is coupled to the load 40. The load 40 may be a non-linear mechanical load, for example a beam-type pumping unit 60, as shown in FIG. 2.

Figure 2:
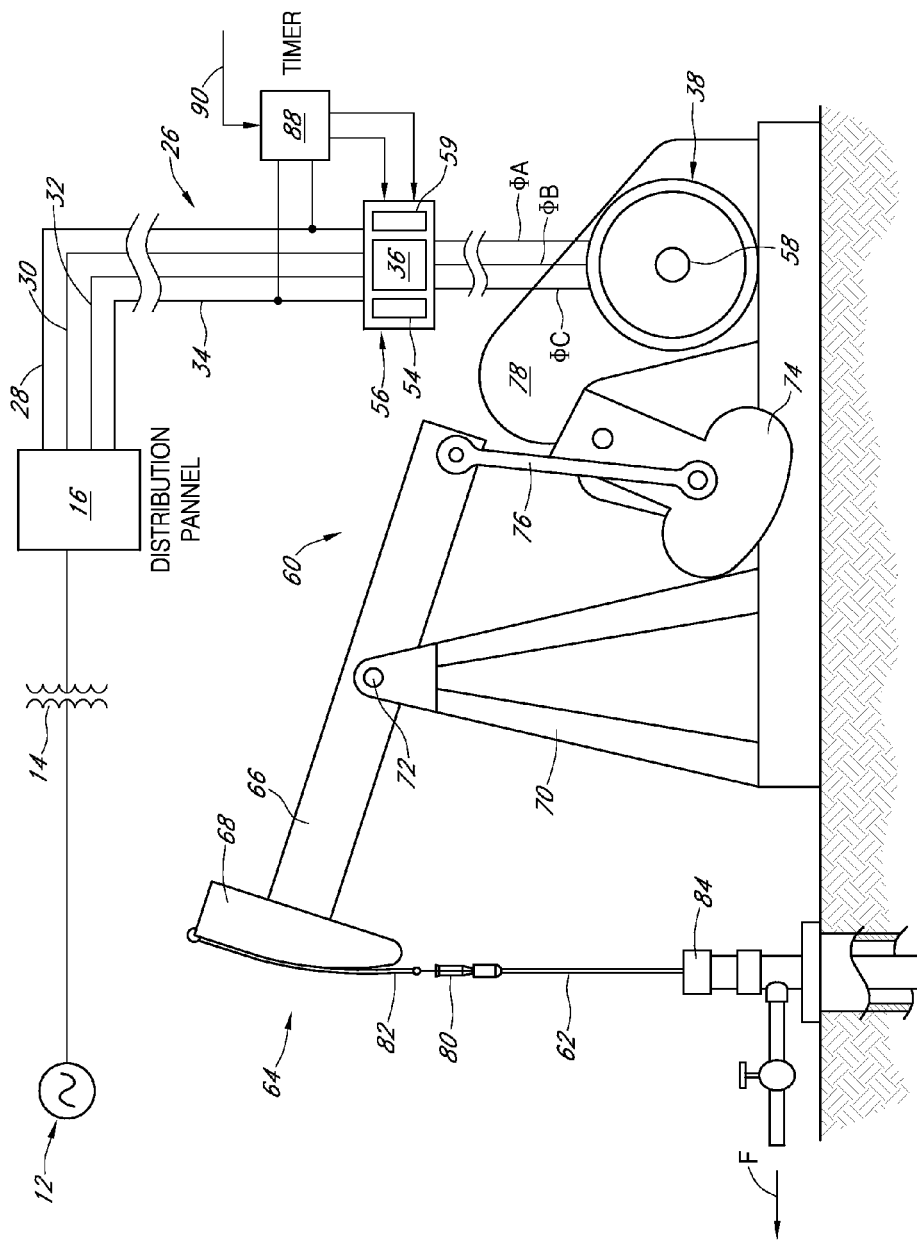
FIG. 2 is a simplified schematic diagram of a non-linear load application in the form of a pump jack and sucker rod pump system that is being supplied with operating power by the power controller system of FIG. 1.

Referring now to FIG. 2, the power controller system 56 of the present invention receives AC operating power from the three phase branch power line 26. The power controller system 56 supplies controlled amounts of AC operating power to a beam-type pumping unit 60. The pumping unit, sometimes referred to as a pump jack, reciprocates a sucker rod 62 and a down-hole pump. The pump lifts formation fluid on each upward stroke of the sucker rod and oil (formation fluid) F flows into the pump on the down stroke, produced to a well head fitting on the up stroke, and then the pumping cycle is repeated.

The pumping unit 60 includes a walking beam type pump jack 64, having a conventional walking beam 66 and a horse head 68. The walking beam 66 is mounted on an A-frame 70 at pivot 72. A counterweight 74 and crank arm 76 are driven through a gear box 78 by the AC induction motor 38. The rotor R of the induction motor is mechanically coupled to the gear box 78 by the power transmission shaft 58. A wire-line hanger 80 is attached to horse head 68 by a short length of cable 82. The lower end of the hanger 80 is secured to the sucker rod 62. The polished section of the sucker rod 62 extends through a surface well head fitting 84 and is connected to a sucker rod string extending from wellhead into a subterranean reservoir through a production tubing string 86.

A conventional timer control unit 88 is connected to one phase of the 480 VAC three-phase power for supplying operating power to an internal pumping cycle timer. The internal timer, which is set to match the known reservoir fill rate, automatically enables pumping cycle operation of the pumping unit 60 for a first predetermined pump-ON interval, and then interrupts AC power to the controller 36 during a predetermined pump-OFF interval. The timer control unit 88 includes a step-down transformer that provides 110 VAC, 60 Hz operating power to the internal timer and contactor relay circuits.

The timer control unit also includes circuitry for automatically interrupting AC power to the controller 36 and resetting the timer to the pump-OFF cycle in response to a pump-OFF control signal 90. The pump-off control signal is generated in response to temporary exhaustion or depletion of formation fluid in the well bore. Hammering impact of the pump plunger is sensed by a conventional fluid impact sensor located on the wire-line hanger 80 on the upper end of the polished rod 62. Pumping action is discontinued until the reservoir replenishes the well bore to a productive level.

Figure 3:
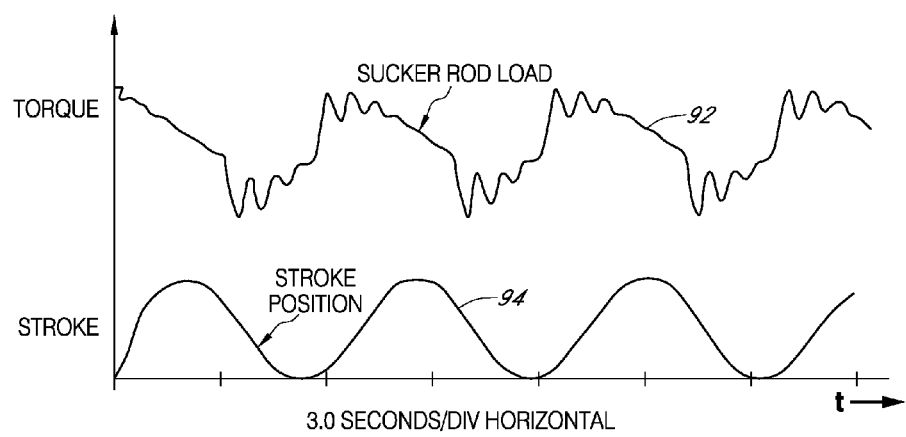
FIG. 3 illustrates typical induction motor torque loading and sucker rod stroke displacement produced by the pump jack and sucker rod pumping system of FIG. 2.

Referring now to FIG. 3, waveforms 92, 94 indicate representative values of induction motor loading and pump stroke displacement, respectively. During normal pumping operation, the pumping unit pumps at a fixed rate, for example at 6.6 stroke cycles per minute (stroke period 9 seconds peak-to-peak). The motor torque loading 92 imposed by the sucker rod load is complex non-linear function of time, containing positive and negative slope ramp functions, and some ringing or oscillating functions.

These torque waveform components are produced during four separate loading phases. The pump uploads formation fluid according to a positive slope load, then transitions through zero load slope at stroke peak where some ringing or oscillation takes place at a relatively high torque level as the counterweight 74 transitions through top dead center. The pump load then transitions along a negative load slope toward stroke bottom. Thereafter the torque load waveform transitions through zero slope at stroke bottom where some ringing or oscillation takes place at a relatively low torque level as the counterweight 74 transitions through bottom dead center.

These non-linear load fluctuations give rise to strong harmonic currents that may interfere with controller operation, and can be injected back through the power distribution branch and into the distribution network. This increases the RMS value of the load current in the power distribution branch, on which the utility service fees are based, thus increasing the customer's energy costs. The power controller system 56 reduces or mitigates these harmonic currents that may be caused by fast switching action of the power controller 36 or by non-linear loads that are powered by the power controller.

Extensive field tests have been conducted with the power controller system 56 installed on a working well located in Lea County, N.Mex. The test results are summarized in Table 1 and Table 2.

The operational data summarized in Table 1 and Table 2 were abstracted from logs that were recorded on separate dates two months apart in connection with two separate tests run on the same induction motor 38 and pumping unit 60. The first test was run while the motor initially was in need of repair and poor operating condition, with bearing problems. The second test was run two months later on the same motor after it had been repaired with new replacement bearings and certified in good operating condition. The motor 38 installed on the field test pumping unit was a 480 volt, three-phase, 40 Hp induction motor. The motor was connected to a walking beam type pumping unit 60 that had been in service for 15 years at the time of the field tests.

The well had been consistent in oil, water, gas production and power consumption for the 15 years preceding the tests. The pumping unit 60 used in the field tests was located at the end of an irregular four-wire three phase branch distribution line 26 that was subject to severe spiking and power surges caused by frequent thunder storms lightning strikes. All the branch power lines were open lines, with no insulation from the transformer 14 to the service pole.

The data logger used during these field tests was a Rustrak Ranger 1231A. The data logger was installed to reflect readings consistent with those of the Kilo Watt Hour meter on the service pole. The meter manufacturer was consulted for installation specifications. There were no interruptions during the log cycles as they were recorded.

The recorded data shown in Table 1 and Table 2 reflect the performance of the induction motor 38 with and without the controller system 56. It should be noted that the voltage remained consistent with and without the controller system 56 installed, but the current was reduced, reactive power was reduced, the real power consumed was reduced, and the motor power factor was somewhat improved with the controller system 56 installed.

The harmonic current distortions in the 3rd and 5th orders were at 5.0 THD to 7.0 THD, without the controller system installed and were on average about 3.0 THD to 4.0 THD with the controller system installed. This demonstrates that controller system 56 was functioning effectively. It should also be noted that the current readings of the three phases of the induction motor were closely balanced in magnitude and stabilized with the controller system 56 installed.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

Test 1: 40 Hp Motor in bad condition - 4 Cycle Log

| Designated Line | Without Controller | | | | With Controller | | | |
|---|---|---|---|---|---|---|---|---|
| | Cycle 1 | Cycle 2 | Cycle 3 | Cycle 4 | Cycle 1 | Cycle 2 | Cycle 3 | Cycle 4 |
| Volts Line 1 | 495.98 | 498.23 | 497.91 | 501.82 | 499.9 | 499.78 | 498.51 | 499.39 |
| Volts Line 3 | 494.03 | 494.51 | 496.75 | 501.35 | 500.3 | 494.51 | 497.81 | 496.78 |
| Amps Line 1 | 29.48 | 29.37 | 29.39 | 29.89 | 24.7 | 24.31 | 24.56 | 24.66 |
| Amps Line 3 | 29.11 | 29.63 | 29.49 | 29.68 | 24.3 | 23.7 | 24.76 | 23.63 |
| PP Line 1 | 0.359 | 0.352 | 0.348 | 0.388 | 0.347 | 0.322 | 0.386 | 0.347 |
| PP Line 3 | 0.357 | 0.354 | 0.345 | 0.388 | 0.346 | 0.322 | 0.386 | 0.347 |
| Total KW | 9.25 | 9.41 | 9.3 | 10.22 | 8.22 | 7.47 | 8.4 | 7.5 |

Measurements taken with Rustrak Ranger 1231A meter
4 Cycle accumulated total KW without controller: 38.18
4 Cycle accumulated total KW with controller: 31.59
Difference: 6.59
17.26% energy savings with controller.

TABLE 2

Test 2: 40 Hp Motor in good condition - 3 Cycle Log

| Designated Line | Without Controller | | | With Controller | | |
|---|---|---|---|---|---|---|
| | Cycle 1 | Cycle 2 | Cycle 3 | Cycle 1 | Cycle 2 | Cycle 3 |
| Volts Ln.1 | 498.17 | 493.49 | 496.86 | 501.89 | 500.72 | 507.38 |
| Volts Ln.3 | 495.43 | 494.49 | 498.43 | 503.25 | 501.26 | 496.27 |
| Amps Ln.1 | 29.09 | 29.24 | 29.04 | 24.05 | 24.04 | 24.45 |
| Amps Ln.3 | 22.98 | 22.31 | 22.7 | 28.57 | 28.46 | 27.29 |
| PF Ln.1 | 0.342 | 0.348 | 0.377 | 0.347 | 0.354 | 0.361 |
| PF Ln.3 | 0.342 | 0.348 | 0.377 | 0.346 | 0.357 | 0.361 |
| Total KW | 8.72 | 8.79 | 9.46 | 7.07 | 7.3 | 7.87 |

Measurements taken with Rustrak Ranger 1231A meter
3 Cycle Log accumulated total KW without controller: 26.97
3 Cycle Log accumulated total KW with controller: 22.24
Difference 4.73
17.53% energy savings with controller

I claim:
1. A power controller system for controlling the amount of electrical power supplied to the windings of an AC induction motor that is coupled to a mechanical load, the AC induction motor having at least one motor phase winding, and the controller system including supply input terminals for receiving AC voltage at a fundamental power distribution frequency from one or more selected phases of an AC power source, and supply output terminals for applying AC voltage to one or more motor phase windings of the AC induction motor, comprising in combination:

an electronic controller including AC power input terminals for receiving AC voltage at a fundamental power distribution frequency from one or more selected phases of the AC power source, and power output terminals connected to the supply output terminals, and switching means coupled between the power input terminals and power output terminals for controlling the conduction of AC current through each phase;

a low pass filter connected in series between the AC power source and the electronic controller, the low pass filter including an input terminal for receiving AC supply voltage from the AC power source and an output terminal for delivering filtered AC supply voltage to one of the controller power input terminals, the low pass filter bring characterized by low attenuation from DC up through the fundamental power distribution frequency to a cutoff frequency, and substantially attenuates current flow at frequencies above the cutoff frequency; and KVAR capacitors connected in shunt from phase to neutral across one or more output terminals of the electronic controller terminal, wherein the capacitance value of each KVAR capacitor is selected and coordinated with the inductance values of the stator phase windings to provide a secondary low pass filter that has low attenuation from DC up through the fundamental power distribution frequency to a cutoff frequency, and substantially attenuates current flow at frequencies above the cutoff frequency.

2. A power controller system for controlling the amount of electrical power supplied to the windings of an AC induction motor that is coupled to a mechanical load, the AC induction motor having at least one motor phase winding, and the controller system including supply input terminals for receiving AC voltage at a fundamental power distribution frequency from one or more selected phases of an AC power source, and supply output terminals for applying AC voltage to one or more motor phase windings of the AC induction motor, comprising in combination:

an electronic controller including AC power input terminals for receiving AC voltage at a fundamental power distribution frequency from one or more selected phases of the AC power source, and power output terminals connected to the supply output terminals, and switching means coupled between the power input terminals and power output terminals for controlling the conduction of AC current through each phase;

a low pass filter connected in series between the AC power source and the electronic controller, the low pass filter including an input terminal for receiving AC supply voltage from the AC power source and an output terminal for delivering filtered AC supply voltage to one of the controller power input terminals, the low pass filter bring characterized by low attenuation from DC up through the fundamental power distribution frequency to a cutoff frequency, and substantially attenuates current flow at frequencies above the cutoff frequency; and a KVAR capacitor connected in shunt phase to neutral relation across each output terminal of the electronic controller, wherein the capacitance value of each KVAR capacitor is selected and coordinated with the inductance values of the stator phase windings to transform the effective load impedance presented by the induction motor into a balanced effective load impedance $Z_L$ that is comparable to the effective source impedance $Z_S$ provided by the primary low pass filter at the input to the power controller.

3. A method of controlling the application of AC operating power from a power source in one or more phases to an AC induction motor to match the load requirements of a mechanical load being driven by the motor, the motor having one or more motor phase windings and an AC voltage applied at a fundamental power distribution frequency to one or more of the motor phase windings, the method comprising the following steps performed for each phase:

coupling a gate-controlled switch in series between a selected phase of the AC voltage and a selected motor phase winding wherein the gate-controlled switch includes first and second control gates, one for each polarity of the AC voltage applied to the switch and the motor;

alternately triggering the gate-controlled switch into a conductive state during each alternation of the AC voltage;

inhibiting the conduction of the gate-controlled switch during each alternation of the AC voltage for a time interval proportional to an interval beginning when the AC voltage of an alternation in the motor winding passes through a first zero-crossing and ending when the corresponding AC current of an alternation in the motor winding passes through a second zero-crossing;

filtering the AC current that is supplied to the gate controlled switch by passing AC current flow with low attenuation loss from DC up through the fundamental power distribution frequency to a cutoff frequency, and substantially attenuating current flow at frequencies above the cutoff frequency; and connecting a KVAR capacitor across the selected phase in shunt to neutral relation, and selecting the capacitance value of the KVAR capacitor in coordination with the inductance value of the inductance motor winding thereby transforming the load impedance presented by the induction motor into a balanced effective load impedance $Z_L$ that is effective to increase the motor power factor.

4. A method of controlling the application of AC operating power to an AC induction motor as set forth in claim 3, including the step of selecting the capacitance value of the KVAR capacitor in coordination with the with the inductance value of the stator phase winding to transform the load impedance presented by the induction motor into an effective load impedance $Z_L$ that is comparable to the effective source impedance $Z_S$ provided by the low pass filter at the input to each gate controlled switch.

* * * * *